United States Patent Office 2,695,303
Patented Nov. 23, 1954

2,695,303

AMIDES OF OXIDIZED PARAFFIN WAX

John P. Buckmann, Redondo Beach, Calif., assignor to Union Oil Company of California, Los Angeles, Calif., a corporation of California No Drawing. Application November 10, 1950, Serial No. 195,127

5 Claims. (Cl. 260—404)

This invention relates to amides of acid mixtures produced by the controlled oxidation of paraffin wax and to methods for their preparation. More particularly, the invention relates to amides of a particular fraction of oxidized paraffin wax and to the method of preparing such amides, which amides have properties unexpectedly different from amides produced from any known organic acid materials. The invention further relates to resins, elastomers and the like containing these amides.

Methods of producing amides of organic acids are well known and acid amides themselves are well known. These compounds are generally white crystalline salts having melting points varying with the molecular weight and the configuration of the acid from which they are derived. It has now been found that amides produced from oxidized paraffin wax, or preferably a selected acid fraction of oxidized paraffin wax, are viscous liquids having physical and chemical properties making them valuable chemical intermediates, polymerization regulators and resin, varnish, and elastomer modifying agents. These amides are particularly effective plasticizing agents for resins and elastomers. They are of especial value in, and most compatible with polyvinyl acetate-chloride-alcohol copolymers and with synthetic elastomers such as butadiene-styrene and butadiene-acrylonitrile copolymers, polychloroprene, alkylene polysulfides, and with natural rubber. The amides of this invention, although apparently incapable of polymerization to any appreciable extent, at least by themselves, are capable of exerting a profound effect on the properties of polymeric materials of the types mentioned above. In all of the above respects the amides of this invention have properties entirely different from amides previously known.

Thus it is an object of this invention to produce a high molecular weight normally liquid or fluid amide.

It is another object of this invention to produce acid amides from relatively cheap raw materials, which amides have chemical and physical properties making them particularly suitable for use as resin and elastomer modifying agents, as ingredients of adhesive compositions, as agents for the modification of protective coatings and as modifiers or processing acids for synthetic or natural rubber or rubber-like or rubber-containing compositions useful in the manufacture of floorings, footwear, automotive, and mechanical goods and the like.

It is a further object of this invention to prepare such acid amides from paraffin wax and particularly from fractions of oxidized paraffin wax, which fractions are produced in relatively high yields and are readily separated from the oxidized wax. A still further object of this invention is to prepare resins, elastomers, adhesives, cements and the like containing these amides.

With these and other objects in mind the invention embraces the high molecular weight fluid or liquid amides obtained by amidation of oxidized paraffin wax or fractions of oxidized paraffin wax, the preparation of these amides, the use of these amides as plasticizers, tackifiers and the like for resins, elastomers and like materials and resin and elastomer compositions containing these amides in suitable proportions to impart desired plasticity and/or tackiness characteristics to the compositions.

In preparing the amides of this invention a paraffin wax, such as a refined or deoiled paraffin wax having a melting point between about 43° C. and 95° C., and preferably between about 55° C. and 80° C., is heated to a temperature between about 100° C. and 140° C., at a pressure between about normal atmospheric pressure and about 20 atmospheres pressure and blown with air or other gas containing free oxygen until the acid number of the product is between about 200 and 350 mg. KOH/g. The resulting crude oxidized wax may be employed directly for preparing the amides of this invention, however it is usually desirable to first wash the oxidized product with water to remove water-soluble materials. Preferably the crude oxidized wax is extracted with water to remove water-soluble oxidation products and subsequently extracted with a light petroleum naphtha, thinner or hydrocarbon solvent, such as pentane, hexane or heptane or a hydrocarbon fraction containing one or more of these hydrocarbons, to separate a naphtha-insoluble fraction, which latter fraction is the preferred acid fraction for use in preparing the amides of this invention. Thus amides having desirable characteristics have been prepared using the crude oxidized wax and the water-insoluble oxidized wax fraction although, as indicated, those having the preferred characteristics are those prepared from the fraction of oxidized wax referred to as the naphtha-insoluble fraction.

The fraction referred to herein as the naphtha-insoluble fraction has an acid number between about 140 and about 200 mg. KOH/g. and a saponification number of between about 225 and about 375 mg. KOH/g. The saponification number-acid number ratio is usually between about 1.6 and 2.2 to 1. Moreover, the ratio of total oxygen to carboxyl oxygen, i. e. oxygen contained in —COOH groupings or in —COOR groupings will be between about 1.4 and 1.6, although this ratio may vary depending upon the conditions and extent of oxidation between 1.2 and 1.8 and these ratios may be modified as by heating to produce an acid fraction in which the total oxygen to carboxyl oxygen ratio is as low as 1.25 or even as low as 1, depending upon the severity of the heat treatment and the conditions under which heat treatment is effected. Presumably the heat treatment results in elimination of water from the molecule, the water arising from the elimination of hydroxyl groups and hydrogen from an adjacent carbon atom, leaving an unsaturated linkage.

It is recognized that acids having the characteristics described hereabove are present in the oxidized mixture obtained as described herein and that extraction with water and with naphtha to obtain the particular water-insoluble, naphtha-insoluble fraction described is but one method of obtaining the segregation of acids of this character. Other methods may be employed and such other methods include extraction of the water-washed oxidized wax with aqueous solutions or slurries of an alkali metal borate such as sodium borate. In such cases the water-washed oxidized wax is extracted with a sufficient amount of the metal borate solution or slurry to produce complexes with the acids which it is desired to separate, i. e. the so-called naphtha-insoluble acids. After extraction the borate phase containing the desired acids is acidified with mineral acid to release the organic acids. This extraction with borax is generally effected at temperatures between 20° and 100° C. and preferably, before extraction, the water-washed oxidized wax is mixed with 1 to 10 volumes of a hydrocarbon solvent such as naphtha.

Other methods of separating the desirable fraction from the water-washed oxidized wax include fractional solution in sulfuric acid or fractional precipitation from sulfuric acid. In the former method the water-washed oxidized wax is repeatedly contacted with progressively increasing concentrations of sulfuric acid starting with about 65% acid and finally extracting with about 95% acid. In such an extraction process it is found that the desirable acid fraction referred to herein as the naphtha-insoluble acid fraction is obtained with 70% to 75% sulfuric acid. The first extraction with 65% acid appears to remove water remaining from the water washing operation, together with normally water-soluble acidic materials and the final extractions, i. e. with acid concentrations of 80 to 90 or 95% concentration of sulfuric acid, result in the separation of acids which are normally soluble in petroleum naphtha. In such cases it is the intermediate fractions that are desirably separated for use in the preparation of amides.

Following the second method, i. e. fractional precipitation from sulfuric acid, the water-washed oxidized wax is contacted with 90% to 95% sulfuric acid to dissolve substantially all of the acids present and, after separation of unreacted wax and neutral oxygenated compounds from the sulfuric acid solution, the fraction comprising sulfuric acid and dissolved acidic constituents is diluted with water, the water being added in increments. In such case the first materials to be precipitated are the neutral oxygenated constitutents and the fatty or naphtha-soluble acids. Following the precipitation of these materials the fraction of acids corresponding to the naphtha-insoluble acids are precipitated by further dilution. It is to be noted that acetic acid may be used in place of sulfuric acid in the above fractionation process.

Various procedures can be employed according to this invention to amidate the oxidized paraffin wax or a fraction thereof to produce amides having the desirable characteristics described herein.

In the preferred method the oxidized wax or a fraction of the oxidized wax, preferably the fraction referred to herein as the naphtha-insoluble fraction, is heated to a temperature between about 50° C. and 150° C. and ammonia gas is bubbled into the mass. The reaction with ammonia is continued until no further water is evolved, requiring generally between about 0.5 and 24 hours. During the heating and blowing with ammonia gas the temperature is gradually increased and the amidation is completed at a temperature between about 150° C. and 250° C., preferably about 180° C.

The amidation may also be caused to occur under pressure, or with various catalysts, such as the ammonium halides, activated clays, silica gel and the like. It is most convenient to remove the water of reaction from the zone of reaction; excess ammonia may then be separated and recycled or used in some other process as desired. The resulting product is substantially neutral, i. e. substantially all of the acid groups having been converted to amide groups during the treatment. Usually the resulting product will contain between about 3% and 7 or 8% of amido nitrogen and between 0.2% and 2% of amino nitrogen as indicated by determining total nitrogen using either the well known Kjeldahl or micro-Dumas nitrogen determination and determining the amino nitrogen by the method of Van Slyke, also well known. The amido nitrogen content is obtained by difference.

As a modification of the preferred method the oxidized wax or fraction thereof is converted to the ammonium salt or soap in any of several ways, i. e. by reaction with ammonium hydroxide or by forming the sodium soap or salt by treatment with caustic alkali and the resulting sodium compound is metathesized with ammonium chloride. The resulting ammonium compound is heated to a temperature between about 150° C. and about 220° C. to effect dehydration and conversion of the ammonium compound to the corresponding amide.

Another method of preparing the amides is to prepare the sodium salt or soap of the oxidized wax or fraction thereof and heat the dry sodium compound with dry ammonium chloride at temperatures between about 150° C. and 450° C. During the heating, water and sodium chloride are formed and the sodium compound is converted directly into the amide.

In another method the oxidized wax or fraction thereof is treated with phosphorus trichloride, thionyl chloride, hydrogen chloride, or the like, and the resulting mixture of acid chlorides is treated with aqueous or alcoholic ammonia. In this treatment ammonium chloride and amides are the resulting products. Temperatures in the range of 0° C. to 50° C. are usually used in effecting this latter conversion. Preferably the reaction is carried out at room temperature.

Still another method of producing the amides consists in first esterifying the oxidized wax or fraction with an alcohol, as for example methyl alcohol, to form the corresponding alkyl esters and the resulting esters are treated with $NH_3$ to convert them into amides. This ammonolysis can be carried out without a solvent or in alcoholic solution or in solution in other polar organic solvent at temperatures ranging from $-10°$ C. to 300° C. and pressures ranging from 1 to 200 atmospheres. The ammonium halides are especially useful catalysts in the conversion.

Still another method of preparing the amides consists in heating the wax oxidate or fraction thereof with an ammonia genitor, e. g., ammonium carbonate, ammonium carbamate, ammonium formate, ammonium acetate, formamide, acetamide or other lower acylamide, to a temperature in the range of 120° C. to 300° C. This reaction results in the liberation of carbon dioxide and water in the case of urea, ammonium carbonate, ammonium carbamate and the like and in the formation of water and formic acid in the case of ammonium formate. With the lower acylamides, the reaction results in the liberation of the coresponding acd in anhydrous form. All of the reaction products other than amides may be removed from the reaction mixture by evaporation or distillation.

The amides prepared by any of the above methods are generally clear dark-brown viscous liquids, substantially insoluble in hydrocarbon solvents such as naphtha, aromatic solvents, e. g., benzene, toluene, xylenes, alcohols and esters, but are soluble in ketones such as acetone, methlyethyl ketone and the like. These amides generally have acid numbers in the range of 15 to as high as about 60 mg. KOH/g. and saponification numbers in the range of about 80 to as high as about 250 mg. KOH/g. with corresponding ester numbers between about 20 to about 200. Although it is substantially impossible to determine molecular weights of the amide products, on the basis of molecular weights of the acids present in the oxidized wax it is logical to assume that these amides have an average molecular weight above about 250.

As employed herein, the term "acid number" is the numerical value of the acidity expressed in milligrams of KOH per gram of substance and is determined by the method described in A. S. T. M. Standards on Petroleum Products and Lubricants, October 1947, page 639. The term "saponification number" as used herein is the saponification equivalent expressed in milligrams of KOH per gram of substance as determined by the method described in the A. S. T. M. Standards, above cited. The term "ester number" is the numerical difference between the saponification number and the acid number and is expressed in the same units.

In employing the amides of this invention as resin or elastomer modifiers, or in the preparation of adhesives and the like, the amount of amide will generally be between 5% and 50 or 60% of the total composition although smaller percentages, such as 1 or 2%, have been found to impart desirable characteristics to the resins or elastomers. Moreover, in some instances as high as 90% of amide, based on the total composition, has been found to be of value in certain applications, particularly in adhesive preparations. The effect of the amide varies somewhat with the different resins, elastomers and the like. However, in general in the case of synthetic resins the incorporation of amide improves flexibility, increases film strength of coatings containing such resins, improves adhesion of coatings containing such resins to surfaces and improves generally the plastic qualities of the resins.

In the case of elastomers such as synthetic or natural rubbers and the like, the incorporation of amides facilitates milling, increases tackiness and reduces viscosity of the unvulcanized products and increases stiffness of the resulting vulcanized products. Moreover, the use of amides aids the incorporation of fillers in rubber and synthetic rubber compositions and permits the incorporation of larger proportions of filler.

In the preparation of cementing compositions where the compositions contain synthetic or natural rubber, the use of amides improves initial tackiness and ultimate joint strength.

In preparing resins modified with amides, resins of the type described hereinabove, preferably in solution in a solvent or mixed solvent capable of dissolving the resin, are mixed with the amide. Mixing can be carried out at ordinary temperatures and it is merely necessary to obtain a relatively complete dispersion of the amide material in the resin solution. Following mixing, solvent may be evaporated to obtain the modified resin or the solutions may be employed as such to produce coatings and the like. Solvents suitable for this purpose include the lower molecular weight ketones such as acetone, methylethyl ketone, methyl isobutyl ketone and the like; the lower molecular weight alcohols such as methyl alcohol, ethyl alcohol, isopropyl alcohol, butyl alcohol and the like; aromatic solvents such as benzene, toluene, xylene and the like; or mixtures of such solvents, depending upon the character of the resin employed. Particularly suitable solvents are those containing methyl isobutyl ketone, anhydrous isopropanol and toluene.

In using amides as modifying agents for natural or synthetic rubbers, the amide is preferably incorporated in the rubber during milling operations. For example, the raw rubber or the synthetic rubber is milled on a rubber mill and during the milling operation amide is added to the rubber in increments until the desired quantity has been incorporated. Where the rubber composition is to to be filled, as with carbon black, zinc oxide or the like, the amide may be added before, during or after the addition of filler.

In preparing cementing compositions having a natural or synthetic rubber base, the amide may be incorporated during the breakdown of the rubber or synthetic rubber on a mill or it may be added to a solution of the rubber or synthetic rubber in cement solvent.

The following examples will serve to illustrate certain forms and modifications of the invention, including the preparation of acids suitable for use in preparing the amides, methods of amidation, i. e., preparing the amides themselves, and various uses of the amides in modifying resins, rubber or rubber-like compositions and the like. It is to be understood that variations in the procedures involved and in the compositions may be made by one skilled in the art without departing from the basic principles of the invention and for this reason the examples presented are not to be taken as limiting the invention to the particular method of preparation of the amides or to the particular uses described.

EXAMPLE I

Acids suitable for use in the preparation of amides of this invention have been prepared by the following process. About 8600 pars by weight of a refined petroleum wax having a melting point of 63° C. were introduced into an oxidation vessel provided with heating and cooling coils and with means for introducing and dispersing air at a point near the bottom of the vessel. The wax was heated to about 130° C. at a pressure of 100 p. s. i. gage. Air was introduced into the oxidation vessel at a rate of 5.5 cu. ft./barrel/minute. After about 20 hours the oxidation reaction had begun to progress satisfactorily and the temperature was decreased to about 125° C. and the temperature was maintained at this point during the remainder of the reaction. Air blowing was continued until the acid number of the wax being oxidized was approximately 265 mg. KOH/g. The product was removed from the oxidation vessel and found to have a saponification number of 485, an acid number of 266 and a saponification number-acid number ratio of 1.8. This product, which amounted to 9000 parts by weight, will be referred to herein as product "A."

A small proportion of product A was reserved for use in subsequent experimental work and the major portion, about 8500 parts, was washed with two 10-volume portions of water at about 100° C. After settling and removal of the aqueous phase there remained 5800 parts by weight of the water-insoluble fraction of wax oxidate. This product, which will be referred to as product "B," had an acid number of 160, a saponification number of 300 and a saponification number-acid number ratio of 1.85.

About 4000 parts by weight of product B was extracted with two 3-volume portions of a light petroleum naphtha having a boiling range of 50° to 85° C. After separation of the naphtha phase the insoluble phase was heated to 120° C. to evaporate the dissolved naphtha. The resulting naphtha-insoluble fraction amounted to 2620 parts by weight, corresponding to a yield of 66% based on product B. This naphtha-insoluble fraction, which will be referred to as product "C," had an acid number of 169, a saponification number of 345 and a saponification number-acid number ratio of 1.75. Analysis of this product indicated a total oxygen to carboxyl oxygen ratio of about 1.5.

About 1000 parts by weight of product B was subjected to borax extraction as described herein. This amount of the water-washed wax oxidate was mixed with 1650 parts by weight of an aqueous solution of sodium borate containing 9.1% by weight of the borax. The mixture thus formed was extracted three times with 1500 parts by weight of a petroleum naphtha at a temperature of 70° C. and the resulting hydrocarbon and aqueous phases separated. The aqueous phase containing the borate complex was heated to 95° C. to evaporate dissolved naphtha and then acidified with 69.5 parts by weight of 42% sulfuric acid. The acid was added slowly with agitation to prevent local over-heating. The separated acid fraction was water-washed to remove inorganic salts and acids.

The naphtha phase obtained in the above extraction step was further extracted with 192 parts by weight of a 13% by weight solution of sodium borate in water at a temperature of 70° C. in order to remove small amounts of acids capable of forming borate complexes which were retained in the naphtha during the original extraction. The aqueous borate complex phase was separated, acidified and water-washed as above to obtain additional acids. These acids were combined with the acids obtained in the initial borax extraction step and the combined products will be referred to hereinafter as product "D." This product has an acid number of 195, a saponification number of 320 and a saponification number-acid number ratio of 1.7, and amounts to 58% by weight of the original product B. Extraction of this fraction with light petroleum naphtha fails to dissolve any acidic material, showing that acids separated in this manner are naphtha-insoluble.

EXAMPLE II

*Direct amidation of naphtha-insoluble fraction of oxidized wax*

A series of five experiments was carried out in which product C was directly treated with ammonia to produce amides and, for comparison, in a sixth experiment a sample of alpha-hydroxy decanoic acid was converted into the corresponding amide by the same procedure. In carrying out these experiments a portion of the acid mixture was heated to a temperature within the range of 80° C. to 220° C. and a stream of ammonia was passed into the heated mixture as rapidly as it could be absorbed. The temperature was gradually increased during the blowing with ammonia to within the range of 150° to 240° C. and this temperature maintained and blowing with ammonia continued until no further quantities of water were evolved. Depending on the batch size, ammonia flow rate, and temperature, the time required for this reaction to occur was between about 0.5 and 48 hours. The results of the various experiments are presented below. In each case, with the exception of the alpha-hydroxy decanamide which was a white crystalline compound and was purified by recrystallization from methanol before analysis, the products were clear dark-brown viscous liquids substantially insoluble in hydrocarbon solvents, alcohols and esters and almost completely soluble in acetone.

TABLE 1

|  | Naphtha-insoluble acids (product C) | | | | | Alpha-hydroxy decanoic acid |
|---|---|---|---|---|---|---|
| Experiment No. | 1 | 2 | a 3 | a 4 | 5 | 6 |
| Final reaction temp., °C. | 210 | 180 | 205 | 205 | 180 | 154 |
| Time, hours | 4 | 17 | 2 | 7 | 16 | 7 |
| Acid No., mg. KOH/g. | 28 | 46 | 43 | 27 | 52 | 0 |
| Saponification No., mg. KOH/g. | 85 | 216 | 179 | 146 | 235 | 0 |
| Ester No., mg. KOH/g. | 57 | 170 | 136 | 119 | 183 | 0 |
| Nitrogen, percent: |  |  |  |  |  |  |
| Dumas (total) | 5.36 |  | 4.83 | 4.46 | 3.2 | 7.6 |
| Kjeldahl (total) |  | 6.2 |  |  |  | 7.6 |
| Van Slyke (amino) | 1.0 |  | 1.2 | 1.2 |  | 0 | a The starting materials for experiments 3 and 4 were obtained from product C by dissolving a portion of product C in acetone and adding hexane in increments until approximately 50% of the original product C had been rejected. The rejected material was used in experiment 3 and the more soluble fraction, after removal of solvents, was used in experiment 4.

EXAMPLE III

*Direct ammonolysis of esters without solvent*

A methyl ester was prepared by refluxing a mixture of 150 parts naphtha-insoluble acids (product C), 300 parts methanol and 1 part sulfuric acid for 4 hours. The solution was cooled, diluted with 900 parts of water and extracted twice with 200 parts of ethyl ether. The combined ether extracts were washed several times with water until neutral, dried over anhydrous sodium sulfate, filtered, and the solvent removed by distillation. The yield of crude methyl ester was about 140 parts.

The methyl esters produced as above were divided, a one-third portion being used as the starting material for experiment 3. The remaining material was fractionated by extraction three times with 4 volumes of pentane. The extract and raffinate phases were then distilled to remove solvent. The original preparation and fractions were characterized as follows:

|  | Pentane-soluble | Pentane-insoluble | Combined crude |
|---|---|---|---|
| Recovery, percent | 48 | 52 |  |
| Appearance | (1) | (2) | (3) |
| Acid No | 5.7 | 31.6 | 15.9 |
| Saponification No | 250 | 254 | 257 |

1 Light orange-brown fluid oil.
2 Very dark-brown viscous oil.
3 Dark-brown waxy oil.

Each of these methyl esters was subjected to direct ammonolysis by a technique directly comparable to that used in Example II for amidation of the acids. The results of tests on the ammonolysis products of these three experiments, together with reaction temperatures and times, are shown in the following table:

TABLE 2

|  | Methyl esters of naphtha-insoluble acids | | |
|---|---|---|---|
| Experiment No | 1 | 2 | 3 |
| Final reaction temperature, °C | 174 | 180 | 250 |
| Time, hours | 14 | 6 | 2 |
| Acid No., mg. KOH/g | 16 | 22 | 11 |
| Saponification No., mg. KOH/g | 204 | 251 | 159 |
| Ester No., mg. KOH/g | 188 | 229 | 148 |
| Nitrogen, percent, Dumas (total) | 3.45 | 3.14 | 4.24 |

Each of the above products is similar to the products of Example II in regard to physical characteristics. The product of experiment 1 is somewhat more fluid than that of experiment 3 and the product of experiment 2 is extremely viscous.

EXAMPLE IV

*Ammonolysis of esters in solvent at low temperature*

Esters were prepared by reacting 3 liters of methanol, 500 g. of product C and 2 g. of concentrated sulfuric acid. This mixture was permitted to stand at 25° C. until the acid number of the product reached a constant value. This required 48 hours. At this time the product was saturated with ammonia at room temperature and allowed to stand for 10 days. At this time the solvent was distilled and completely removed by vacuum stripping at 150° C. and 5 mm. pressure. The yield was 464 g. of a dark-brown very viscous liquid.

TABLE 3

|  | Methyl esters of naphtha-insoluble acids |
|---|---|
| Acid No., mg. KOH/g | 34 |
| Saponification No., mg. KOH/g | 250 |
| Ester No., mg. KOH/g | 116 |
| Nitrogen, percent: | |
| Kjeldahl (total) | 4.9 |
| Van Slyke (amino) | 0.7 |

EXAMPLE V

*Amidation with urea*

A mixture of 21 parts by weight of urea and 100 parts by weight of product C (approximately 0.6 mol urea per carboxyl group) was heated at 160° C. for 6 hours. At the end of this time the product was poured into water and washed to remove unreacted urea and other water-soluble products. Approximately 76 parts of water-insoluble product was recovered.

The water-washed product was found to be only partially soluble in acetone. Extraction with acetone gave one fraction amounting to about 44 parts of acetone-soluble amides, the remaining 32 parts being insoluble in acetone. Analysis of the soluble and insoluble fractions after removing the acetone by distillation gave the following results:

TABLE 4

|  | Acetone-soluble portion | Acetone-insoluble portion |
|---|---|---|
| Appearance | (1) | (2) |
| Acid No., mg. KOH/g | 47 | 48 |
| Saponification No., mg. KOH/g | 213 | 212 |
| Ester No., mg. KOH/g | 166 | 164 |
| Nitrogen, percent, Dumas (total) | 4.45 | 5.06 |

1 Dark red-brown viscous oil.
2 Dark red-brown tacky resin.

EXAMPLE VI

*Amidation with urea*

Example V repeated using 106 parts of product B (of Example I) in place of product C gives an amide having an acid number of 50 and a total nitrogen content of 4.7%. This product is a dark red-brown viscous oil. This amide is used successfully in the various compositions described in Examples VII to XI and produces effects comparable to those obtained with the amide of product C. In general the effect per unit weight of this amide is somewhat less than that obtained with the amide of product C.

EXAMPLE VII

*Use of amides as resin modifiers*

A commercial resin consisting of a co-polymer made from a mixture of approximately 91% vinyl chloride, 3% vinyl acetate and 6% vinyl alcohol, having an intrinsic viscosity in cyclohexanone at 20° C. of 1.39 (as determined by the method of Kraemer, Industrial & Engineering Chemistry, vol. 30, page 1200, 1938), was dissolved in a solvent consisting of 25% methyl isobutyl ketone, 25% anhydrous isopropanol and 50% toluene and portions of this solution were modified with the amide of naphtha-insoluble acids prepared as in Example II, experiment 3, and, for comparison, other portions of the resin solution were modified with typical modifying agents. In each case the resulting solutions consisted of 25 ml. of the mixed solvent, 4 g. of resin and 1 g. of modifier. Each of the solutions was used to prepare a film on a glass test panel. The films in each case were approximately 0.005 inch thick before drying. The films were air dried to remove solvent then oven dried at 130° C. for one-half hour. The characteristics of the films resulting from the use of various modifiers are shown in the following table. These films were evaluated empirically:

TABLE 5

| Modifier | Flexibility | Film strength | Adhesion | Color of film |
|---|---|---|---|---|
| 1. None | Poor | Good | Excellent | Colorless, clear. |
| 2. Dibutyl selacate | Fair | do | Good | Do. |
| 3. Methyl ester of gasoline-insoluble acids | do | do | Poor | Do. |
| 4. Butyl ester of gasoline-insoluble acids | Good | Fair | do | Do. |
| 5. Amide [a] | do | Excellent, much better than 1 | Very strong, much better than 1 | Light-brown, clear. |

[a] Prepared in Example II, experiment 3.

EXAMPLE VIII

*Use of amides as rubber softeners, tackifiers, modifiers and the like*

The following carbon reinforced rubber and synthetic rubber compositions were compounded with and without the use of 20 parts of amide prepared in Example II per 100 parts of raw rubber or raw synthetic rubber. The composition of each of the rubber compounds is shown in the following table:

TABLE 6

| Experiment No. | 1 | 2 | 3 | 4 |
|---|---|---|---|---|
| Butadiene-styrene copolymer [a] | 100 | 100 | | |
| Raw rubber [b] | | | 100 | 100 |
| Carbon black [c] | 40 | 40 | 40 | 40 |
| Amide of naphtha-insoluble acids (Example II) | | 20 | | 20 |
| Stearic acid | 2 | 2 | 2 | 2 |
| Zinc oxide | 5 | 5 | 5 | 5 |
| Benzothiazyldisulfide | 3 | 3 | 3 | 3 |
| Sulfur | 2 | 2 | 2 | 2 |

[a] This copolymer is known as "cold rubber."
[b] No. 1 smoked sheet natural rubber.
[c] Medium processing channel type.

The above mixtures were compounded on a 2-roll mill at 70° C. and removed from the mill in the form of a sheet ¼" thick in order to obtain samples for viscosity tests. Standard methods of compounding as described in the American Society for Testing Materials, Test Number D–15–41, "Sample Preparation for Physical Testing of Rubber Products," were used with minor variations. The order of addition of ingredients to the mill was the same order as shown in the above table. Samples were taken for viscosity and disc molding tests before the sheets for tensile testing were milled.

It was noted that the initial breakdown and subsequent mixing were facilitated by the incorporation of the amide in experiments 2 and 4.

In other experiments this effect was shown in a more striking way by adding only a portion of the carbon, then a portion of amide, and repeating the operation until the additions were completed. Mixing is also greatly facilitated in a Banbury mixer by charging rubber, amide and carbon all at once. However, in the following experiments samples mixed on the 2-roll mill according to the standard test method were used.

Differences in breakdown and mixing are shown numerically by a determination of "shearing viscosity" of the compound before curing. This value was determined on a Mooney plastometer as described in Industrial and Engineering Chemistry, Analytical Edition, vol. 6, No. 2, pages 147–151, 1934. The values obtained are arbitrary and vary between 0, indicating very soft, and 100 for the extremely stiff products. Four-minute viscosities with the large rotor (taken after a one-minute warmup period and four minutes of operation of the plastometer so that equilibrium was established) for the compositions of Experiments 1 to 4 were as follows:

Experiment No.: Viscosity
1 ----- 69.5
2 ----- 56
3 ----- 55
4 ----- 40.5

It is to be noted that the viscosity of the synthetic rubber composition (experiment 1) was reduced 13.5 points (experiment 2) and that the viscosity of the natural rubber compound (experiment 3) was reduced 14.5 points (experiment 4) by the addition of the amides. This is comparable to the results obtained using many commercial softeners. It is to be noted further that a definite increase in tackiness was observed when amides were employed both with the synthetic and the natural rubbers. Characteristics of the vulcanized products were determined by preparing molded discs 4" in diameter and ¼" thick from the raw rubber and synthetic rubber preparations. In each case discs were molded at 150° C. and 3000 p. s. i. pressure for one-half hour. The stiffness of the vulcanized products was definitely increased by the addition of the amides. Thus, even though in unvulcanized form, the products containing amides were less viscous than those not containing amides, and following vulcanization those containing amides were noticeably stiffer.

The effect of the amides in rubber and synthetic rubber compositions is to improve milling characteristics by reducing viscosity, increasing tackiness, etc. during the compounding stages and to increase stiffness of the resulting vulcanized products. This is a characteristic of special value in the manufacture of flooring, footwear, gaskets and various mechanical goods.

This effect was studied further by preparing tensile test specimens and evaluating them on a Scott tensile tester. The preparation of these experiments was carried out according to the methods of the A. S. T. M. D–15–41 and D–412–41, "Tension Testing of Vulcanized Rubber." In preparing these samples for tensile tests two additional rubber compositions were prepared using the compositions of experiments 1 and 3 above with the addition of 20 parts per 100 of rubber or synthetic rubber or a commercial rubber softener of the saturated polymerized hydrocarbon type. The particular material employed was Para-Flux obtained from C. P. Hall Company. These two additional products will be referred to hereinbelow as the products of experiments 5 and 6, respectively. Thus, the product of experiment 5 will be the composition described in experiment 1 with the addition of 20 parts of commercial rubber softener and the product of experiment 6 will be the composition of experiment 3 with rubber softener.

The results of tests on the six samples of rubber of the composition described above were as follows:

TABLE 7

| Experiment No. | Composition | 300% modulus p. s. i. | Tensile strength, p. s. i. | Ultimate elongation, percent |
|---|---|---|---|---|
| 1 | Synthetic rubber | 850 | 4,000 | 650 |
| 2 | Synthetic rubber+amide | 1,200 | 2,600 | 580 |
| 5 | Synthetic rubber+commercial softener | 360 | 2,700 | 900 |
| 3 | Natural rubber | 1,030 | [a] >4,000 | 550 |
| 4 | Natural rubber+amide | 780 | 2,700 | 630 |
| 6 | Natural rubber+commercial softener | 580 | 3,300 | 720 |

[a] Higher than the calibration of available tester.

In the above table the 300% modulus is a function of stiffness and it will be noted that with the synthetic rubber stocks addition of amide softener actually increases the stiffness of the vulcanizate, while with natural rubber there is a slight decrease but the decrease is less than that obtained with a commercial softener. The typical drop in tensile strength resulting from the addition of softener is observed both with the commercial softener and the amides. The ultimate elongation is affected less by the amides than by the typical commercial softener.

Other experiments have shown that the presence of amide has little if any effect on the cure time or on aging characteristics of rubber or synthetic rubber compositions.

In connection with the above experiments it is to be pointed out that generally somewhat less than 20 P. H. R. of softener (20 parts of softener per 100 parts of rubber or synthetic rubber) is used in commercial preparations. However, this large amount was employed in order to show the effects of amides and commercial softeners more clearly. In this connection, the use of smaller proportions of amides has been found to give results intermediate between those obtained with 20 parts and those obtained where amides were not employed, as would be expected. It is to be noted further that 20 parts of amides was about the maximum amount which could be conveniently handled on a 2-roll mill. Higher proportions apparently do not permit proper bonding on such a mill, but such compositions may be prepared in a Banbury mixer and for special purposes products conatining more than 20 parts of the amides are desirable. Moreover, for economic reasons it is sometimes desirable to increase the proportion of amides, thus effectively using the amide as a softener and as an extender. In such cases, by increasing the amount of carbon black or other filler, products having desirable characteristics are obtained.

EXAMPLE IX

*Use of amides as rubber softeners, tackifiers, modifiers and the like*

A series of experiments was carried out in which rubber and synthetic rubber compositions were prepared using various non-carbon fillers such as are employed in the trade in the preparation of white or other light-colored rubbers or rubber-like products. The milling procedures used were similar to those employed in Example VIII in which carbon black was used as the filler. Some minor variations were necessary, as will be described, to suit the particular fillers being used.

The compositions of the products prepared in the various experiments are shown below:

TABLE 8

| Experiment No. | Composition, grams | | | | | | | | | | |
|---|---|---|---|---|---|---|---|---|---|---|---|
| | 1 | 2 | 3 | 4 | 5 | 6 | 7 | 8 | 9 | 10 | 11 |
| 1. Raw rubber a | 300 | 300 | 300 | 300 | 300 | 300 | 300 | | | 300 | 300 |
| 2. Synthetic rubber b | | | | | | | | 300 | 300 | | |
| 3. Calcium carbonate, (calcene T) | 375 | 375 | | | | | | | | | |
| 4. Calcium silicate, (Silene E. F.) | | | d 250 | d 375 | d 375 | | | | | | |
| 5. Silica (HiSil) | | | | | | 200 | 200 | 200 | 200 | | |
| 6. Kaolin (Iceberg pigment) | | | | | | | | | | 200 | 200 |
| 7. Amide c | | 30 | | 30 | | | 30 | | 30 | | 30 |
| 8. Petroleum sulfonate-butanol d | | | | | 15 | | | | | | |
| 9. Diethylene glycol | | | | | | | | 10 | 10 | | |
| 10. Zinc oxide | 15 | 15 | 15 | 15 | 15 | 15 | 15 | 15 | 15 | 15 | 15 |
| 11. Stearic acid | 4.5 | 4.5 | 4.5 | 4.5 | 4.5 | 9 | 9 | 9 | 9 | 9 | 9 |
| 12. Hydroquinone monobenzyl ether | 3 | 3 | 3 | 3 | 3 | 3 | 3 | 3 | 3 | 3 | 3 |
| 13. Tetramethyl thiurium disulfide | | | 1 | 1 | 1 | 0.5 | 0.5 | 0.5 | 0.5 | 0.5 | 0.5 |
| 14. Mercaptobenzothiazole | 2.5 | 2.5 | 2.5 | 2.5 | 2.5 | 3 | 3 | 3 | 3 | 3 | 3 |
| 15. Zinc dibutyldithiocarbamate | | | 1 | 1 | 1 | | | | | | |
| 16. Sulfur | 12 | 12 | 12 | 12 | 12 | 9 | 9 | 9 | 9 | 9 | 9 | a Number 1 smoked sheet natural rubber.
b Butadiene-styrene copolymer, known as "cold rubber."
c Amides of naphtha-insoluble acids from oxidized paraffin wax prepared according to the procedure outlined in Example II, experiment 2.
d This pigment was difficult to incorporate on a 2-roll mill. Addition of amide as in experiment 4 and of petroleum sulfonate-butanol mixture in experiment 5, after adding about one-half of the filler, simplified the addition of the remainder.

Mooney viscosities of the above described compositions were determined as described in Example VII except that the small rotor was used since these compounds were more viscous than the carbon filled ones. The results were as follows:

Experiment No.:
1 _____ 35
2 _____ 39
3 _____ (a)
4 _____ (a)
5 _____ (a)
6 _____ 93
7 _____ 48
8 _____ 78
9 _____ 56
10 _____ 27
11 _____ 28 a Too viscous to determine. The values were higher than the plastometer calibration.

Again it will be observed that in the compositions of high viscosity, a reduction of viscosity was effected by the addition of amide. In the low viscosity compositions such as those filled with calcium carbonate and kaolin, little can be determined by the viscosity; however, the ease of compounding is readily noted by the mill operator. This is even more srtiking in the compositions of experiments 3, 4, and 5 which were deliberately overloaded with filler in order to show the processing improvement brought about by amide addition. In experiment 3, the milling was extremely difficult as the filler did not incorporate in the mixture and fell off the rolls in small pieces. This "drying-out" of the batch was largely eliminated by the addition of 10 P. H. R. of amides; in fact, its use permitted the addition of still more filler.

Tensile test specimens were prepared from products of each of the above experiments and cured at 130° C. for one hour. The specimens were tested on the Scott tensile tester as described in Example VIII with the following results:

TABLE 9

| Exp. No. | Color | Hardness a | 300% modulus, p. s. i. | Tensile strength, p. s. i. | Ultimate elongation, percent | Permanent set at break,b percent |
|---|---|---|---|---|---|---|
| 1 | Gray | 54 | 450 | 2,560 | 640 | 26 |
| 2 | Brown | 68 | 660 | 2,850 | 640 | 53 |
| 3 | Light tan | 73 | 800 | 2,800 | 560 | 38 |
| 4 | Medium tan | 83 | 1,070 | 2,000 | 520 | 21 |
| 5 | Light tan | 79 | 1,890 | 2,440 | 400 | 28 |
| 6 | Gray | 54 | 690 | 1,710 | 500 | 36 |
| 7 | Tan | 78 | 1,120 | 2,470 | 500 | 40 |
| 8 | do | 74 | 1,000 | 2,100 | 520 | 25 |
| 9 | Brown | 80 | 990 | 1,650 | 460 | 28 |
| 10 | Light gray | 66 | 900 | 2,220 | 460 | 29 |
| 11 | Tan | 66 | 760 | 2,100 | 500 | 36 | a Determined by A. S. T. M. test D676–46T, "Indentation of Rubber by Means of the Durometer," as described in A. S. T. M. Standards, part 3B, page 994.
b Measured immediately after break of specimen from tensile test piece.

Geneally it is found that the hardness as determined by the Durometer and the 300% modulus are somewhat comparable in that rubber compositions of high durometer hardness will also have a high 300% modulus. It will be noted in the above table that with all of the fillers tested at equal loadings the effect of the amides of this invention on hardness was very slight and generally increased rather than decreased the hardness of the vulcanized product.

EXAMPLE X

*Use of amides as tackifiers in the preparation of cementing compositions*

About 3 parts by weight of a butadiene-styrene copolymer known as "cold rubber" was broken down on a 2-roll mill by milling for 5 to 10 minutes and then dissolved in 10 parts of toluene with the aid of heat. To this solution was added a solution of 1 part amide, as produced in Example II, in 5 parts of methyl isobutyl ketone.

For purposes of comparison a second preparation was made using 3 parts of the butadiene-styrene copolymer in 15 parts of toluene without the inclusion of amide.

Both of the above cements were suitable for application in photo and map mounting and other paper cementing operations and in cementing rubber to metal, rubber to wood, etc. However, the cement containing the amide had a far greater initial tackiness and greater ultimate joint strength than the cement which did not contain the amide.

EXAMPLE XI

*Use of amides in flexible non-drying cements*

Natural rubber (No. 1 smoked sheet) was broken down on a 2-roll mill for a period of 5 to 10 minutes and sheeted off at a thickness of about 0.03 inch. About 74 parts of amide produced in Example II was placed in a dough mixer at 70° C. and 26 parts of the milled rubber was added. The rubber was cut up in small pieces and added over a period of about 15 minutes. The mixture was processed for about one hour until it was homogeneous and then removed from the mixer and cooled.

The resulting cement was tough, elastic, thermoplastic and extremely tacky. It was eminently suitable for use as a thermoplastic, non-curing, flexible cement. This product is successfully used in cementing asphalt, mastic or rubber tile or linoleum to wood, cement or composition flooring. Application is simple, it is merely necessary to warm the cement until nearly fluid and spread it on to the surface or surfaces to be cemented, as with a trowel or notched cement applicator. This cement is easily and safely reworked and/or thinned by heating a surface coated with it as by means of a blow torch, gas burner, electric heater, or the like. Joints cemented with this composition are tough, permanently elastic, impervious to water and alkaline cleaning compounds.

It is found that ratios of amide to rubber can be varied from about 8:1 to 2:1, the higher amide ratio cements being the less viscous and more tacky.

A cement prepared by adding an amount of linseed oil equal to the rubber content to a portion of the above cementing composition had limited curing properties, that is a slight tendency to harden with age, but retained its elastic character. Other drying oils or semi-drying oils may be employed in place of the linseed and amounts of drying oil may be varied to obtain varying degrees of curing of the resulting cement.

The foregoing description and examples of my invention are not to be taken as limiting since many variations may be made by those skilled in the art without departing from the spirit or the scope of the following claims.

I claim:

1. A fluid amide prepared by oxidizing paraffin wax by air-blowing said wax at a temperature between 100° C. and 140° C. until the acid number of the wax is between 200 and 350 mg. KOH/g., separating from the oxidized wax a fraction having an acid number-saponification number ratio between 1.6 and 2.2 to 1 and a total oxygen to carboxyl oxygen ratio between 1.2 and 1.8 to 1 by removing water-soluble and petroleum naphtha-soluble constituents from said oxidized wax and amidating said fraction.

2. A fluid amide according to claim 1 in which said amidation is effected by treatment of the said fraction with ammonia.

3. A fluid amide according to claim 1 in which said amidation is effected by treatment of said fraction with urea.

4. A fluid amide according to claim 1 in which said amidation is effected by esterifying the said fraction with a low molecular weight aliphatic alcohol and subsequently treating the ester with ammonia to convert the ester into the corresponding amide.

5. A resin and elastomer plasticizer consisting of fluid amides prepared by oxidizing paraffin wax with a gas containing free oxygen at a temperature between 100° C. and 140° C. to produce an oxidized wax having an acid number between about 200 and about 350 mg. KOH/g., separating from the oxidized wax a fraction insoluble in water and in petroleum naphtha, which fraction has an acid number-saponification number ratio between 1.6 and 2.2 to 1 and a total oxygen-carboxyl oxygen ratio between 1.2 and 1.8 to 1 and amidating said fraction.

References Cited in the file of this patent

UNITED STATES PATENTS

| Number | Name | Date |
|---|---|---|
| 1,989,968 | Bruson | Feb. 5, 1935 |
| 2,054,638 | Schirm | Sept. 15, 1936 |
| 2,070,991 | Hund | Feb. 16, 1937 |
| 2,089,212 | Kritchevsky | Aug. 10, 1937 |
| 2,096,181 | Jahrstorfer et al. | Oct. 19, 1937 |
| 2,103,872 | Schoeller et al. | Dec. 28, 1937 |
| 2,166,971 | Schmidt et al. | July 25, 1939 |
| 2,212,611 | Macdonald | Aug. 27, 1940 |
| 2,340,112 | Davis et al. | Jan. 25, 1944 |
| 2,415,356 | Kellog et al. | Feb. 4, 1947 |
| 2,606,915 | Garbo | Aug. 12, 1952 |
| 2,607,783 | Turinsky | Aug. 19, 1952 |
| 2,608,562 | Roe | Aug. 26, 1952 |
| 2,609,380 | Goldstein | Sept. 2, 1952 |
| 2,614,981 | Lytle | Oct. 21, 1952 |

OTHER REFERENCES

"Outline of Organic Nitrogen Compounds" (Degering), published by University Lithoprinters, Ypsilanti, Mich., 1945.